United States Patent
Lee et al.

(10) Patent No.: US 7,996,561 B2
(45) Date of Patent: Aug. 9, 2011

(54) ZIGBEE NETWORK DEVICE FOR SEPARATELY DETERMINING NETWORK PARAMETER AND ASSIGNING ADDRESSES, AND ADDRESS ASSIGNMENT METHOD THEREOF

(75) Inventors: Myung-jong Lee, New York, NY (US); Yong Liu, New York, NY (US); Xu-hui Hu, New York, NY (US)

(73) Assignees: Samsung Electronics Co., Ltd., Suwon-Si (KR); City University of New York, New York, NY (US)

( * ) Notice: Subject to any disclaimer, the term of this patent is extended or adjusted under 35 U.S.C. 154(b) by 1820 days.

(21) Appl. No.: 11/151,651

(22) Filed: Jun. 14, 2005

(65) Prior Publication Data
US 2005/0281207 A1  Dec. 22, 2005

Related U.S. Application Data

(60) Provisional application No. 60/578,879, filed on Jun. 14, 2004.

(30) Foreign Application Priority Data

Apr. 25, 2005 (KR) ................. 10-2005-0034071

(51) Int. Cl.
*G06F 15/16* (2006.01)
(52) U.S. Cl. ........ 709/245; 370/408; 370/255; 370/256; 711/220
(58) Field of Classification Search ............ 709/223, 709/220
See application file for complete search history.

(56) References Cited

U.S. PATENT DOCUMENTS

| | | | |
|---|---|---|---|
| 2003/0007461 A1* | 1/2003 | Chen et al. | 370/254 |
| 2003/0117966 A1* | 6/2003 | Chen | 370/255 |
| 2003/0227931 A1* | 12/2003 | Chen et al. | 370/408 |
| 2004/0018839 A1* | 1/2004 | Andric et al. | 455/433 |
| 2004/0133689 A1* | 7/2004 | Vasisht | 709/228 |
| 2005/0135275 A1* | 6/2005 | Hester et al. | 370/256 |
| 2005/0180447 A1* | 8/2005 | Lim et al. | 370/432 |
| 2005/0201300 A1* | 9/2005 | Bridgelall | 370/254 |
| 2005/0282639 A1* | 12/2005 | Tanaka et al. | 463/42 |
| 2006/0245360 A1* | 11/2006 | Ensor et al. | 370/238 |

FOREIGN PATENT DOCUMENTS

JP  02309732 A  12/1990

OTHER PUBLICATIONS

Hester L., ("neuRFon Netform: A Self-Organizing Wireless Sensor Network", 2002, pp. 264-369).*

* cited by examiner

*Primary Examiner* — Jude J Jean Gilles
*Assistant Examiner* — Jaren M Means
(74) *Attorney, Agent, or Firm* — Sughrue Mion, PLLC

(57) ABSTRACT

A ZigBee network device assigns addresses to its child devices. The ZigBee network device includes a communication section that connects the ZigBee network device to other devices and which communicates with the other devices; a parameter determination section that determines at least one network parameter; a calculation section that calculates addresses for child devices of the ZigBee network device based on a determined network parameter, where each of the child devices is connected to the ZigBee network device via the communication section; and a controller that assigns addresses to the child devices of the ZigBee network device. At least one determined network parameter is at least one of $C_m$, which indicates a maximum number of the child devices of the ZigBee network device, and $R_m$, which indicates a maximum number of the child devices of the ZigBee network device which have routing capabilities.

8 Claims, 5 Drawing Sheets

ZIGBEE NETWORK DEVICE FOR SEPARATELY DETERMINING NETWORK PARAMETER AND ASSIGNING ADDRESSES, AND ADDRESS ASSIGNMENT METHOD THEREOF

CROSS-REFERENCE TO RELATED APPLICATIONS

This application claims priority from U.S. Provisional Application No. 60/578,879 filed on Jun. 14, 2004 in the United States Patent and Trademark Office, and from Korean Patent Application No. 2005-34071 filed on Apr. 25, 2005 in the Korean Intellectual Property Office, the entire disclosures of which are incorporated herein by reference.

BACKGROUND OF THE INVENTION

1. Field of the Invention

Apparatuses and methods consistent with the present invention relate to address assignment in a ZigBee network device belonging to a ZigBee network environment, and, more specifically, to a ZigBee network device for separately determining a network parameter under a ZigBee network environment, and an address assignment method of the ZigBee network device.

2. Description of the Related Art

ZigBee features low power consumption and low cost at half the cost of Bluetooth owing to the compactness of its software and related components. ZigBee is a wireless communication technique based on controls and sensors which is suitable for a home network.

The ZigBee network standard specification v0.85[1] defines a cluster tree structure covering all devices in a personal area network (PAN). Every device joining the cluster tree structure is assigned an address according to the tree structure. The assigned address is used for the routing in the ZigBee network environment.

For the address assignment, a ZigBee coordinator defines two network parameters Cm and Lm in consideration of the size of the entire network. Cm is a maximum number of devices connectable to each device (hereinafter, referred to as children), and Lm is a maximum level depth of the tree structure.

According to a conventional address assignment method in the ZigBee network environment, an address is assigned to each device. The ZigBee coordinator assigns addresses taking into account that the children of each device are connected to each device. For example, the ZigBee coordinator with the address s assigns s+1 to a first device. A second device is assigned s+1+$Cskip_{Ls}$. The address of Cm-th device is s+1+($C_m$−1)·$Cskip_{Ls}$. $Cskip_{Ls}$ can be obtained from Equation 1.

$$Cskip_{Ls} = \frac{B_L - \sum_{k=0}^{Ls}(Cm)^k}{Cm^{Ls+1}} \quad \text{[Equation 1]}$$

In Equation 1, $B_L$ is an address size of the whole network, and Ls is a level number of the ZigBee coordinator with the address s. $B_L$ can be derived from Cm and Lm based on Equation 2.

$$B_L = \frac{1 - Cm^{Lm+1}}{1 - Cm} \quad \text{[Equation 2]}$$

The ZigBee coordinator provides the defined Cm and Lm to each device. Each device assigns addresses to its respective children in the same manner.

FIG. 1 is a conceptual diagram of the conventional ZigBee network environment where the addresses are allocated according to the conventional method. In FIG. 1, a device A serves as a top ZigBee coordinator. The address of the device A is 0, and Cm and Lm are determined to be 4, respectively. Devices B, C, and D are connected to the Device A as its children. The whole address size $B_L$ assignable by the top ZigBee coordinator is 341 based on Equation 2. $Cskip_{Ls}$, of the top ZigBee coordinator is 85 based on $B_L$ and Equation 1. Thus, the interval between the addresses of the children B, C, and D is 85. Specifically, the address of the first device B is 1, the address of the second device C is 86, and the address of the device D is 171. Cskip of the device B, C, and D at the first level (Ls=1) is 21 based on Equation 2. Thus, addresses of devices E though J at the second level (Ls) are at 21 intervals.

According to the conventional method as illustrated in FIG. 1, each device assigns the addresses using the fixed Cm and Lm over the while ZigBee network. The devices receive Cm and Lm from their parents and assign the addresses to their children based on Equation 1 and Equation 2.

An end-device to which children cannot be connected, may be connected to the mid-level of the ZigBee cluster tree. If the address is assigned to the end device in the manner discussed above, the address resources are wasted: For example, if a device E is an end-device, the address block {3~28} cannot be used by any device since these addresses are reserved for device E's descendants. As a result, the addresses are wasted and cannot be used efficiently.

In this regard, a new parameter Rm, which indicates the maximum number of children of each device with routing ability, is defined and used for the address assignment. $Cskip_{Ls}$ can be changed to Equation 3.

$$Cskip_{Ls} = \frac{1 + C_m - R_m - C_m \cdot R_m^{Lm-Ls-1}}{1 - R_m} \quad \text{[Equation 3]}$$

As for a device with the routing ability and operable as the coordinator with respect to other devices, an address space is reserved in consideration of its descendents. In contrast, the continuous addresses are assigned to the end-device.

FIG. 2 is a conceptual diagram illustrating conventional ZigBee address assignment. In FIG. 2, Rm=2, Cm=4, and Lm=3. Since Rm=2, the top ZigBee coordinator A can have two devices B and C with the routing ability and two devices D and E without the routing ability. Address blocks {1~13} and {14~26} are assigned to the devices B and C, respectively. Meanwhile, the continuous addresses 27 and 28 are assigned to the devices D and E, respectively. The above address assignment can avoid the waste of the address space. However, Cm and Lm are fixed to all of the devices with the routing capable devices according to the conventional method as shown in FIG. 2. As the devices have different characteristics and different conditions, the number of the children also varies. Therefore, the waste of the address space is inevitable due to the fixed Cm and Lm.

SUMMARY OF THE INVENTION

An aspect of the present invention provides an address assignment method for a ZigBee network cluster tree structure for allocating addresses by determining a network parameter differently for each device in the ZigBee network cluster tree structure to avoid the waste of address space.

A ZigBee network device includes a communication section connecting to another device and communicating with the other device; a parameter determination section determining a network parameter; a calculation section calculating addresses for children using the network parameter, where the children are connected to the Zigbee network device via the communication section; and a controller assigning the calculated addresses to the children.

The parameter determination section may determine at least one of Cm, which indicates a maximum number of children connectable to the communication section; and Rm, which indicates a maximum number of devices with routing ability among the children.

The calculation section calculates the addresses based on the equation: $sm=s+1+(Cm_A-1)*Cskip_A \cdot sm$ is an address assigned to a child device, s is the address of the ZigBee network device, $Cm_A$ is a maximum number of children of the ZigBee network device, $Cskip_A$ is an address interval of the children, $Cskip_{AP}$ is an address interval of a parent, and $B_L$ is a whole size of addresses available to the top ZigBee coordinator.

The parameter determination section may determine at least one of Cm and Rm in accordance with at least one of available power capacity and a number of neighbor devices.

The parameter determination section may determine Rm in accordance with a level depth in a cluster tree structure.

The ZigBee network device may further include an input section receiving a predetermined value. The parameter determination section may determine at least one of Cm and Rm to be the value input to the input section.

According to another aspect of the present invention, an address assignment method of a ZigBee network device under a ZigBee network environment of a cluster tree structure, includes determining a network parameter; when the children are connected, calculating addresses to be assigned to children using the network parameter; and assigning the calculated addresses to the children based on a connection order of the children.

The network parameter may be at least one of Cm, which indicates a maximum number of connectable children, and Rm, which indicates a maximum number of devices with routing ability among the children.

The address calculation may be based on the equation: $sm=s+1+(Cm_A-1)*Cskip_A \cdot sm$ is an address to be assigned to a child device, s is the address of the ZigBee network device, $Cm_A$ is a maximum number of children of the Zigbee network device, $Cskip_A$ is an address interval of the children, $Cskip_{AP}$ is an address interval of a parent in the cluster tree structure, and $B_L$ is a whole size of addresses available to the top ZigBee coordinator.

The network parameter determination may determine at least one of Cm and Rm in accordance with at least one of available power capacity of the ZigBee network device and a number of neighbor devices.

The network parameter determination may determine Rm in accordance with a level depth of the ZigBee network device in a cluster tree structure.

The network parameter determination may determine the network parameter to be a value input from outside.

BRIEF DESCRIPTION OF THE DRAWINGS

The above and/or other aspects of the invention will become apparent and more readily appreciated from the following description of exemplary embodiments, taken in conjunction with the accompanying drawing figures of which.

DETAILED DESCRIPTION OF EXEMPLARY EMBODIMENTS OF THE INVENTION

Figure 1:
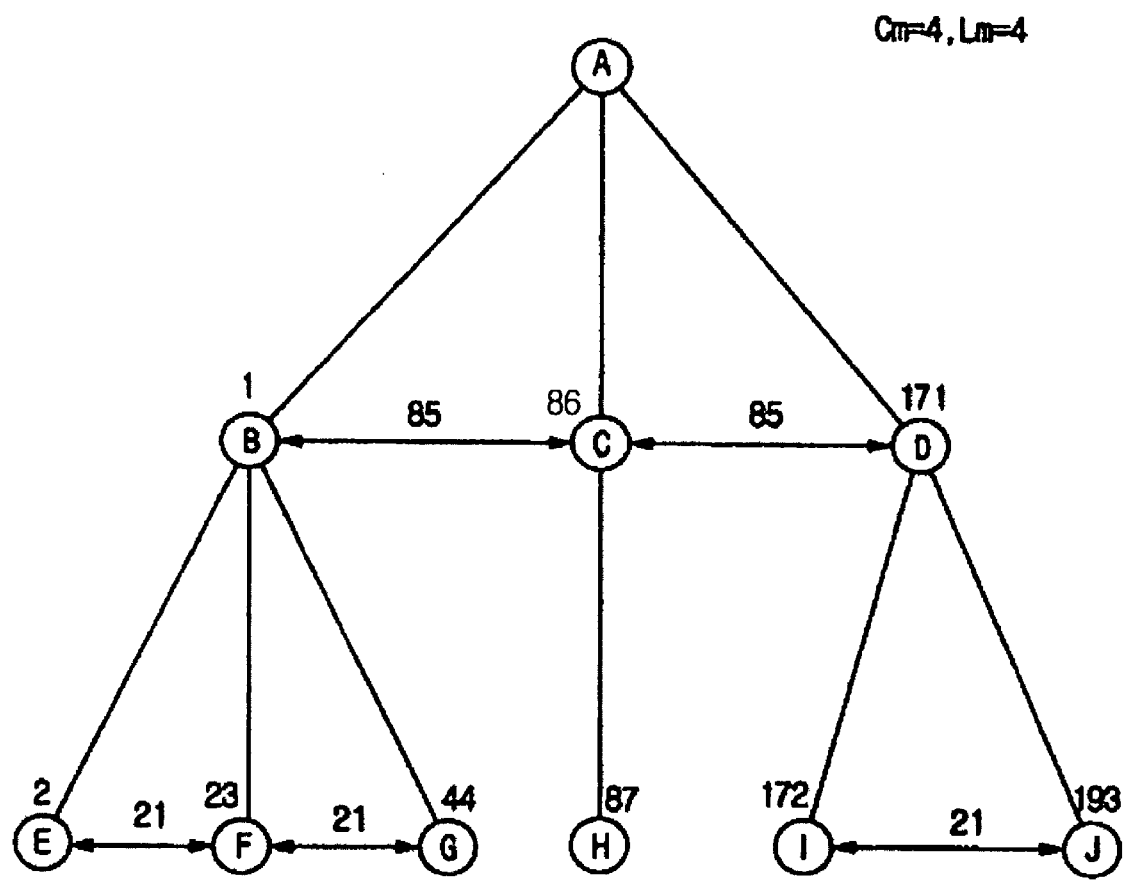
FIG. 1 is a conceptual diagram of a ZigBee network environment according to a conventional address assignment method.
Figure 2:
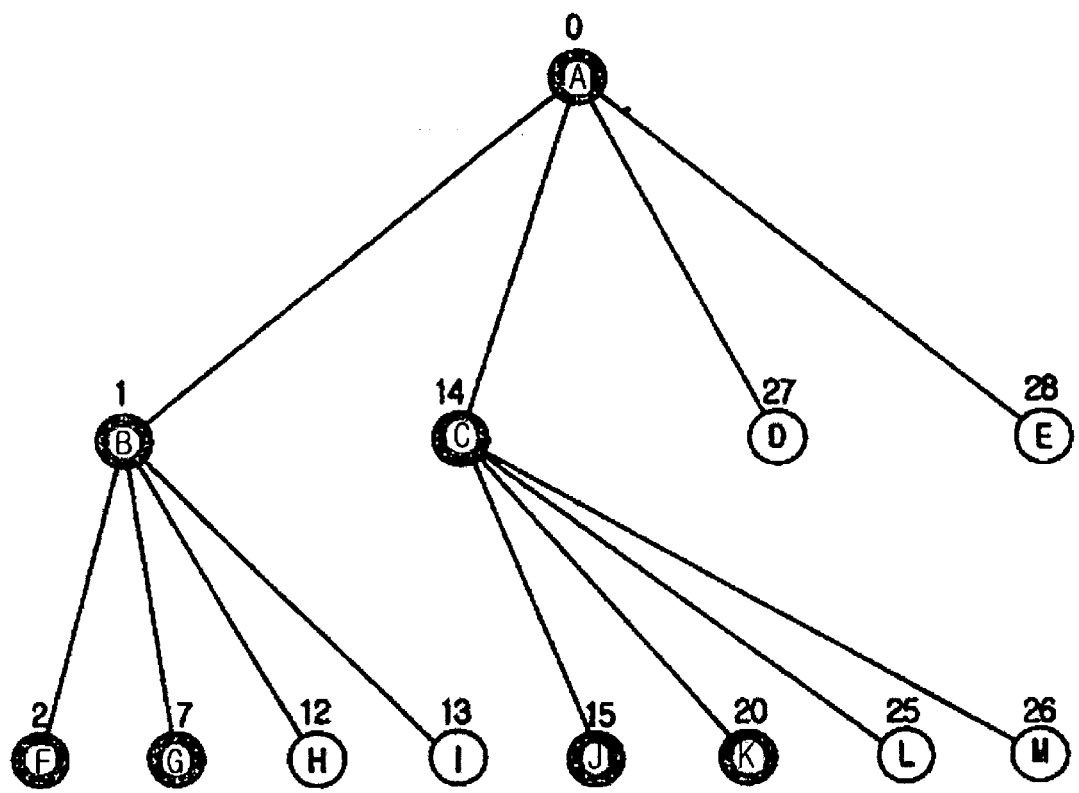
FIG. 2 is a conceptual diagram of a ZigBee network environment according to another conventional address assignment method.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention with unnecessary detail.

Figure 3:
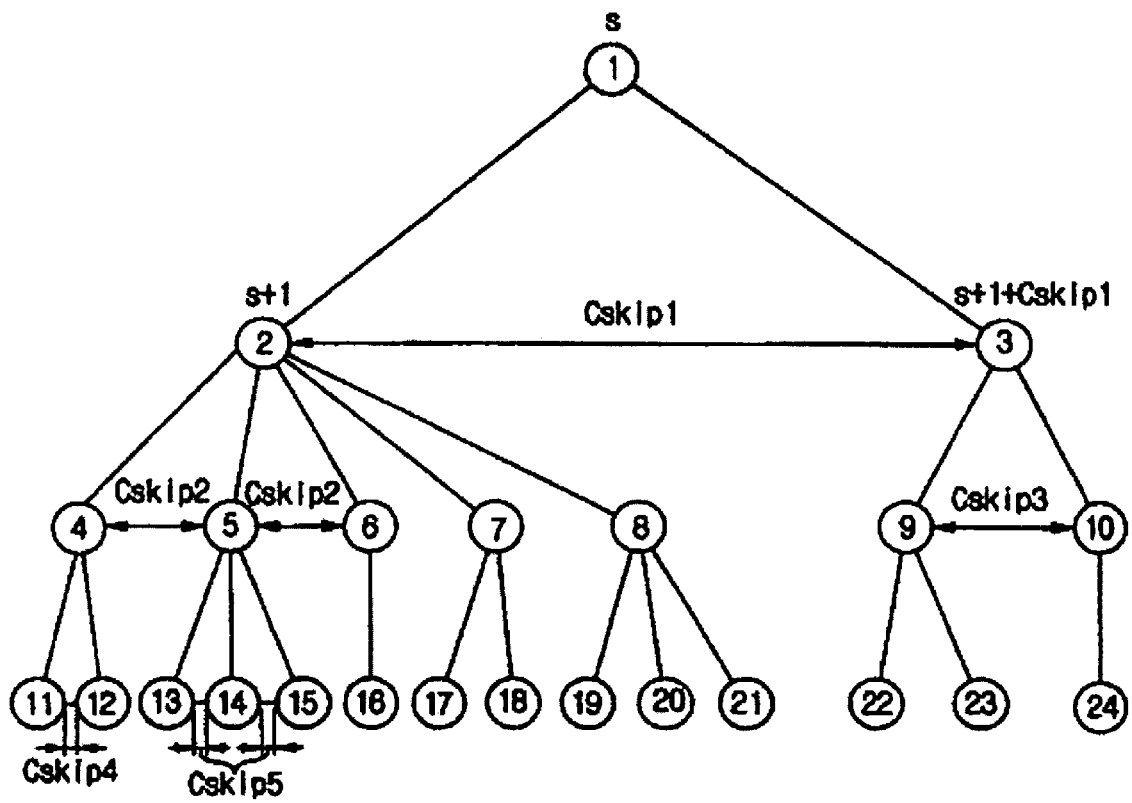
FIG. 3 is a conceptual diagram of a ZigBee network environment in which addresses are distributed according to an exemplary embodiment of the present invention.

FIG. 3 is a conceptual diagram illustrating a ZigBee network environment of a cluster tree structure in which addresses are assigned according to an embodiment of the present invention. In FIG. 3, a top ZigBee coordinator 1 assigns addresses to its children 2 and 3 in consideration of the whole address size. Suppose that the address of the top ZigBee coordinator 1 is s, the address of a first child 2 is s+1 and the address of a second child 3 is $s+1+Cskip_1$. $Cskip_1$ is an address interval between the children connectable to the top ZigBee coordinator 1. $Cskip_1$ can be obtained from Equation 4.

$$Cskip_1 = \frac{B_L - 1}{Cm_1}$$ [Equation 4]

In Equation 4, $Cm_1$ is a maximum number of children connectable to the top ZigBee coordinator 1, and $B_L$ is a size of the whole address available at the top ZigBee coordinator 1.

$B_L$ can be calculated by applying $Cm_1$ of the top ZigBee coordinator 1 into Equation 2. The top ZigBee coordinator 1 may determine $Cm_1$ depending on its capability and characteristics. Also, the top ZigBee coordinator 1 may determine the whole level depth Lm of the cluster tree structure.

The device 2 separately determines $Cm_2$ depending on its capability and characteristic. $Cskip_2$ can be derived from $Cskip_1$ of the top ZigBee device 1 and $Cm_2$ based on Equation 5.

$$Cskip_A = \frac{Cskip_{AP} - 1}{Cm_A} \quad \text{[Equation 5]}$$

Equation 5 is a generalized equation with respect to a child A. $Cskip_2$ can be obtained by substituting A by 2 in Equation 5. $Cskip_{AP}$ is Cskip used by a parent of the child A. If A is 2, $Cskip_{AP}$ becomes $Cskip_1$. When $Cskip_2$ is obtained from Equation 5, the device 2 assigns addresses of s+2, s+2+$Cskip_2$, s+2+2*$Cskip_2$, s+2+3*$Cskip_2$, and s+2+4*$Cskip_2$ to its children 4, 5, 6, 7, and 8.

Another child 3 calculates $Cskip_3$ based on Equation 5. As $Cm_3$ is separately determined, $Cskip_3$ is different from $Cskip_2$. Consequently, addresses s+2+$Cskip_1$ and s+2+$Cskip_1$+$Cskip_3$ are assigned to children 9 and 10 of the device 3. As described above, since the size of the address block varies for each device, the whole address can be efficiently utilized.

Rm, which is the maximum number of devices with the routing ability among the children, can be separately determined by each device. In this situation, Equations 4 and 5 can be changed to Equation 6.

$$Cskip_A = \frac{Cskip_{AP} - 1 - (Cm_A - Rm_A)}{Rm_A} \quad \text{[Equation 6]}$$

$$Cskip_A = \frac{B_L - 1 - (Cm_A - Rm_A)}{Rm_A}$$

when serving as the top ZigBee coordinator

In Equation 6, $Cm_A$ is a maximum number of children connectable to the device A, and $Rm_A$ is a maximum number of children with the routing ability. $Cskip_A$ is the address interval between the children, $Cskip_{AP}$ is the address interval used by the parent, and $B_L$ is the whole size of the address available at the top ZigBee coordinator. By calculating Cskip in consideration of Rm, the addresses can be utilized more efficiently.

After the addresses are assigned to the devices, the routing commences. Suppose that a certain device R (not shown) in the cluster tree structure receives a packet destined for a device D. The device R checks if it is the destination. If the device R is the destination, the device R looks at the packet content and operates according to the content. If the device R is not the destination, the device R determines whether the device D belongs to its assigned address block. If the device D belongs to its address block, the device R forwards the packet to a root device of the cluster of the device D. Conversely, if the device R does not belong to the address block, the device R forwards the packet to its parent. Thus, the packet is delivered to the device D.

Figure 4:
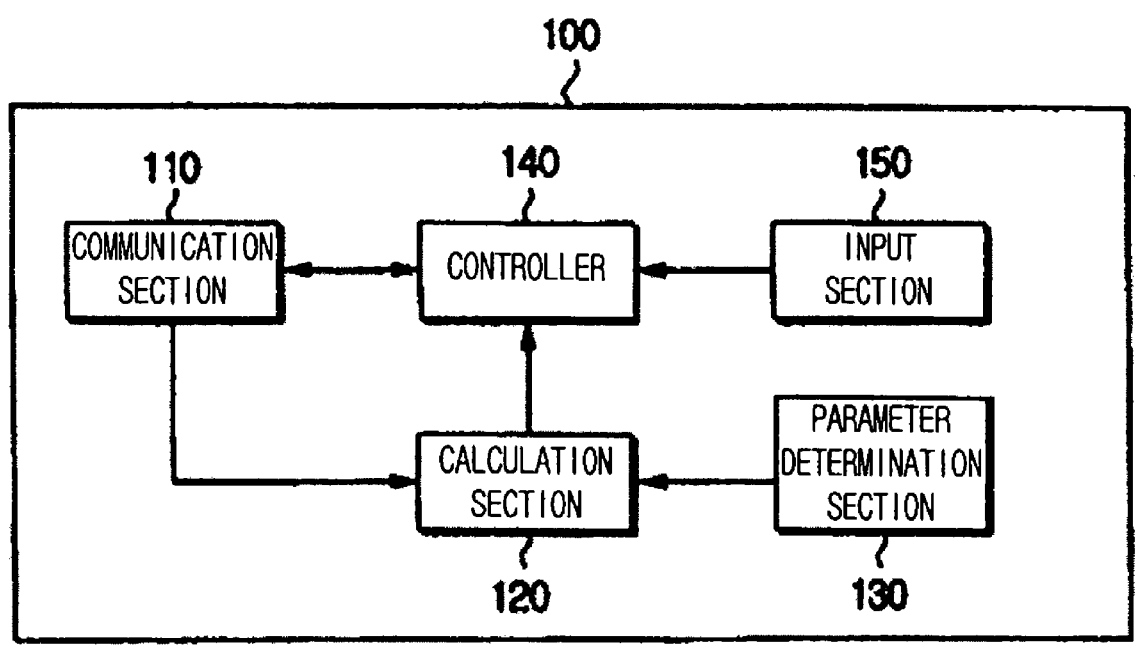
FIG. 4 is a block diagram of a ZigBee network device according to an exemplary embodiment of the present invention.

FIG. 4 is a block diagram of a ZigBee network device according to an embodiment of the present invention. As illustrated in FIG. 4, the ZigBee network device 100 includes a communication section 110, a calculation section 120, a parameter determination section 130, a controller 140, and an input section 150.

The communication section 110 is responsible for communications with another device. Particularly, the communication section 110 can conform to IEEE 802.15.4 standard for the communication. The communication section 110 may be implemented by combining a modulator and demodulator (MODEM) chip, a media access control (MAC) chip, and an antenna chip.

The calculation section 120 calculates addresses to be assigned to children connected to the communication section 110 based on at least one network parameter. In detail, the calculation section 120 calculates Cskip based on one of Equations 4, 5, and 6. The addresses for the children are obtained using the calculated Cskip. For example, if the address of the ZigBee network device 100 is s, the address sm assigned to $Cm_A$-th child is s+1+($Cm_A$−1)*$Cskip_A$.

The parameter determination section 130 determines the network parameters such as Cm and Rm used in Equations 4, 5, and 6. The parameter determination section 130 can determine at least one of Cm and Rm based on of the characteristics of the ZigBee network device 100. The determination scheme may determine (1) Cm and Rm as used at the parent; (2) Cm and Rm in proportion to the communication capacity of the communication section 110; (3) Cm and Rm in proportion to the number of neighbor devices; (4) Cm and Rm under the control of an external address controller; (5) Rm in proportion to the level depth of the cluster tree structure; (6) Cm and Rm as input manually from outside; or (7) Cm and Rm by combining the above schemes.

The scheme (1) can be adopted when the characteristic of the ZigBee network device 100 is similar to that of the parent. When the address is assigned from the parent, Cm and Rm of the parent are provided together and used for the address calculation.

According to scheme. (2), Cm and Rm are determined based on how many children the ZigBee network device 100 can manage. Particularly, Cm and Rm may be determined depending on whether the power is supplied from a battery or a plug socket. If the batter has the limited capacity, Cm and Rm can be set to low. Furthermore, Cm and Rm may be determined differently from each other depending on the percentage of the remaining battery capacity. If the power supply is from a plug socket, Cm and Rm can be set to high.

According to scheme (3), Cm and Rm are determined based on the number of neighbor devices, that is, depending on density. To construct the cluster tree structure, association requests and replies are required. Hence, it can be seen that the more number of association requests received, the more number of the neighbor devices. The more number of the neighbor devices, the more number of devices connectable to the children. Then, Cm and Rm can be set to high.

According to scheme (4), Cm and Rm are determined by an address controller. The address controller functions to determine and provide random Cm and Rm in consideration of the characteristics of the devices in the cluster tree structure. The address controller may be a central address controller that provides integrated management for all devices in the ZigBee cluster tree structure, or a distributed address controller that separately manages each of the devices.

According to scheme (5), the network parameter Rm is determined in proportion to the level depth of the cluster tree structure. The full level depth Lm of the cluster tree structure is determined by the top ZigBee coordinator. Accordingly, for the lower levels in the cluster tree structure, there is less necessity to connect to children with routing abilities. Thus, Rm can be set to low. Conversely, as for the higher level in the cluster tree structure, Rm can be set to higher.

According to the scheme (6), a user randomly determines Cm and Rm using the input section 150. The input section 150 receives Cm and Rm via buttons provided to the body of the ZigBee network device 100.

The controller 140 assigns the addresses calculated at the calculation section 120 based on the connection order of the children. Upon receiving a packet destined for a device, the communication section 110 performs the routing as mentioned above.

Figure 5:
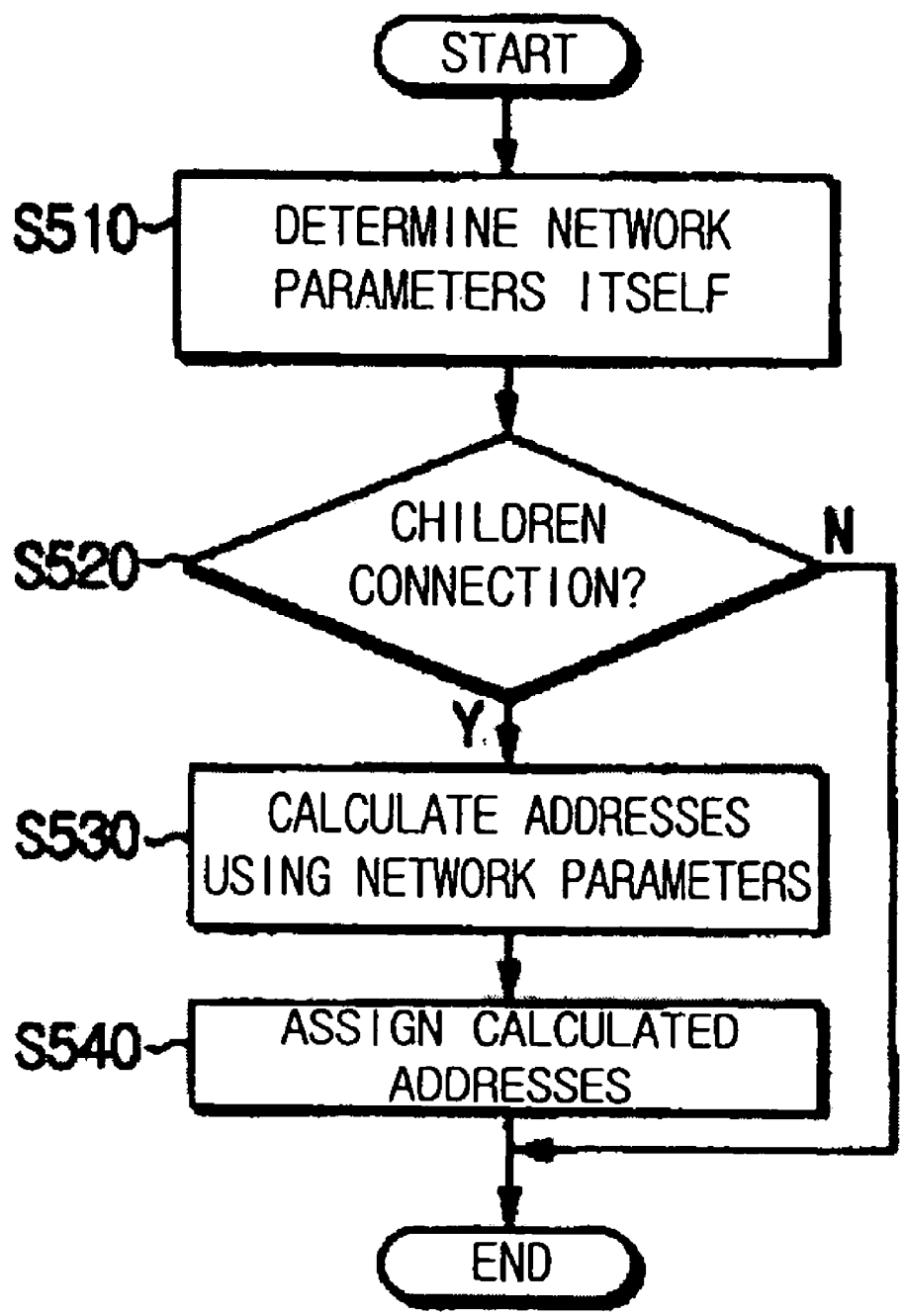
FIG. 5 is a flowchart of the address assignment of the ZigBee network device according to an exemplary embodiment of the present invention.

FIG. 5 is a flowchart explaining the address assignment method according to an embodiment of the present invention. In FIG. 5, the ZigBee network device itself determines its network parameters (S510). The network parameters Cm and Rm can be determined according to the above-explained schemes (1) through (7).

When children are connected to the device (S520), the ZigBee network device calculates the addresses to be assigned to the children using the predetermined network parameters (S530). The addresses are calculated based on Equations 4, 5, and 6.

The addresses are assigned to the children based on their connection order (S540). The respective children may separately determine their Cm and Rm and calculate the addresses for their children.

In light of the foregoing as set forth above, under the ZigBee network environment with the cluster tree structure, the ZigBee network device itself can determine the network parameters such as the maximum number of the children connectable thereto and the maximum number of the children with the routing ability. Addresses are assigned to the children using the determined network parameters. As a result, it is possible to efficiently utilize the whole address space and to avoid the waste of the addresses.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A ZigBee network device comprising:
a communication unit which connects the ZigBee network device to other devices and which communicates with the other devices;
a parameter determination section which determines at least one network parameter;
a calculation section which calculates addresses for child devices of the ZigBee network device based on a determined network parameter, wherein each of the child devices is connected to the ZigBee network device via the communication unit; and
a controller which assigns the addresses to the child devices of the ZigBee network device;
wherein the at least one determined network parameter is at least one of Cm, which indicates a maximum number of child devices of the ZigBee network device, and Rm, which indicates a maximum number of the child devices of the ZigBee network device which have routing capabilities, and
wherein the Cm and Rm are individually and discretely calculated by each ZigBee network device in a ZigBee network environment.

2. The ZigBee network device of claim 1, wherein the calculation section calculates each address based on the following equations:

$$sm = s + 1 + (Cm_A - 1) * Cskip_A, \quad \text{I)}$$

$$\text{II)} \ Cskip_A = \frac{Cskip_{AP} - 1}{Cm_A}, \text{ and}$$

$$\text{III)} \ Cskip_A = \frac{B_L - 1}{Cm_A},$$

where equation III is used when the ZigBee network device is operating as a top ZigBee coordinator,
where
sm is an address to be assigned to a child device,
s is the address of the ZigBee network device,
$Cm_A$ is the maximum number of the child devices of the ZigBee network device,
$Cskip_A$ is an address interval of the child devices of the ZigBee network device,
$Cskip_{AP}$ is an address interval of a parent device of the ZigBee network device, and
$B_L$ is a number of addresses available to the top ZigBee coordinator.

3. The ZigBee network device of claim 1, wherein the calculation section calculates each address based on the following equations:

$$sm = s + 1 + (Cm_A - 1) * Cskip_A, \quad \text{I)}$$

$$Cskip_A = \frac{Cskip_{AP} - 1 - (Cm_A - Rm_A)}{Rm_A}, \text{ and} \quad \text{II)}$$

$$Cskip_A = \frac{B_L - 1 - (Cm_A - Rm_A)}{Rm_A}, \quad \text{III)}$$

where equation III is used when the ZigBee network device is operating as a top ZigBee coordinator,
where
sm is an address to be assigned to a child device,
s is the address of the ZigBee network device,
$Cm_A$ is the maximum number of the child devices of the ZigBee network device,
$Rm_A$ is a maximum number of the child devices of the ZigBee network device which have routing capabilities,
$Cskip_A$ is an address interval of the child devices of the ZigBee network device,
$Cskip_{AP}$ is an address interval of a parent device of the ZigBee network device, and
$B_L$ is a number of addresses available to the top ZigBee coordinator.

4. The ZigBee network device of claim 1, wherein the parameter determination section determines Rm in accordance with a level depth in a cluster tree structure.

5. An address assignment method of a ZigBee network device under a ZigBee network environment of a cluster tree structure, the method comprising:
determining, by a processor of the ZigBee network device, at least one network parameter;
calculating addresses for child devices of the ZigBee network device; and
assigning the addresses to the child devices of the ZigBee network device based on a connection order of the children;
wherein the at least one network parameter is at least one of Cm, which indicates a maximum number of the child devices of the ZigBee network device, and Rm, which indicates a maximum number of the child devices of the ZigBee network device with routing capabilities, and
wherein the Cm and Rm are individually, and discretely calculated by each ZigBee network device in a ZigBee network environment.

6. The address assignment method of claim 5, wherein the calculating of the addresses is based on the following equations;

$$sm = s+1+(Cm_A-1)*Cskip_A, \quad \text{I)}$$

$$Cskip_A = \frac{Cskip_{AP}-1}{Cm_A}, \text{ and} \quad \text{II)}$$

$$Cskip_A = \frac{B_L-1}{Cm_A}, \quad \text{III)}$$

where equation III is used when the ZigBee network device is operating as a top ZigBee coordinator,
where
sm is an address to be assigned to a child device,
s is the address of the ZigBee network device,
$Cm_A$ is the maximum number of the child devices of the ZigBee network device,
$Cskip_A$ is an address interval of the child devices of the ZigBee network device,
$Cskip_{AP}$ is an address interval of a parent device of the ZigBee network device, and
$B_L$ is a number of addresses available to the top ZigBee coordinator.

7. The address assignment method of claim 5, wherein the calculating of the addresses is based on the following equations:

$$sm = s+1+(Cm_A-1)*Cskip_A, \quad \text{I)}$$

$$Cskip_A = \frac{Cskip_{AP}-1-(Cm_A-Rm_A)}{Rm_A}, \quad \text{II)}$$

$$Cskip_A = \frac{B_L-1-(Cm_A-Rm_A)}{Rm_A}, \quad \text{III)}$$

where equation III is used when the ZigBee network device is operating as a top ZigBee coordinator,
wherein
sm is an address to be assigned to a child device,
s is the address of the ZigBee network device,
$Cm_A$ is the maximum number of the child devices of the ZigBee network device,
$Rm_A$ is a maximum number of the child devices of the ZigBee network device which have routing capabilities,
$Cskip_A$ is an address interval of the child devices of the ZigBee network device,
$Cskip_{AP}$ is an address interval of a parent device of the ZigBee network device, and $B_L$ is a number of addresses available to the top ZigBee coordinator.

8. The address assignment method of claim 5, wherein the determining of the at least one network parameter comprises determining Rm in accordance with a level depth of the ZigBee network device in a cluster tree structure.

* * * * *